Aug. 1, 1967
J. L. WILLIAMS ETAL
3,333,816
ELASTOMER SEAT GATE VALVE
Filed March 16, 1964
2 Sheets-Sheet 1
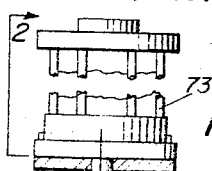
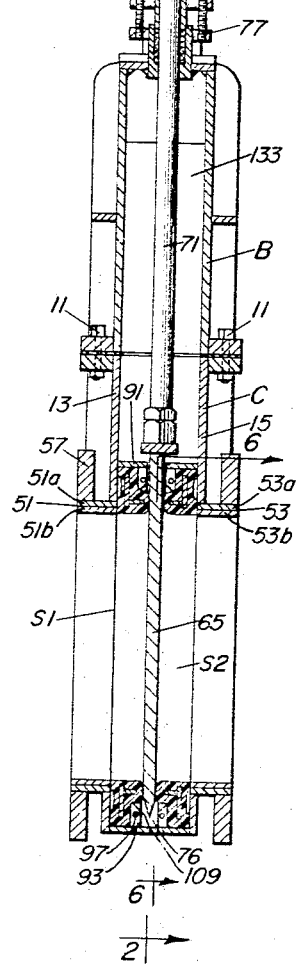
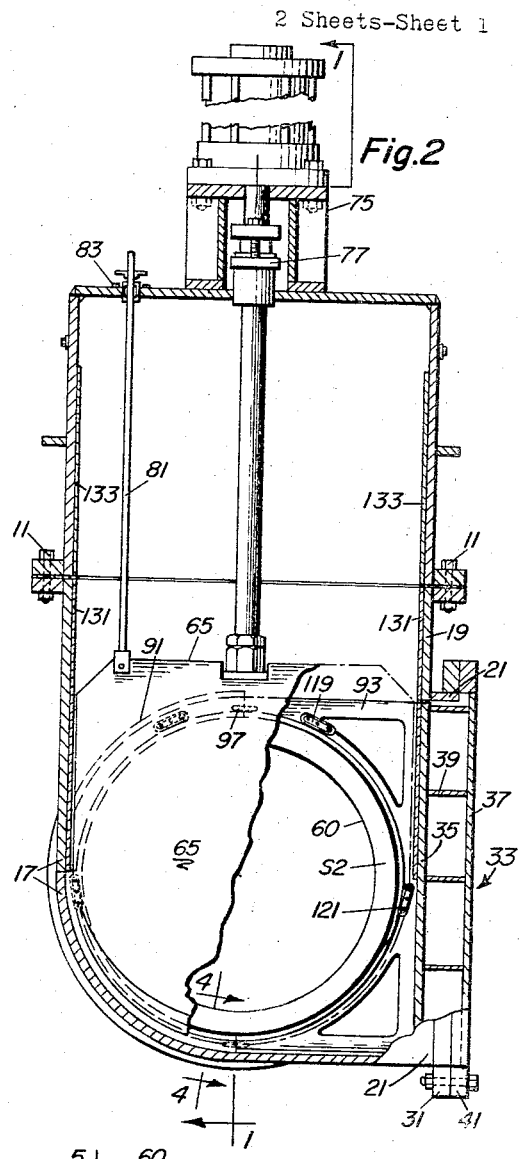
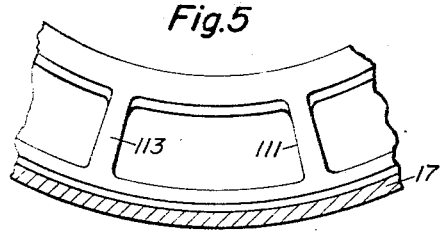
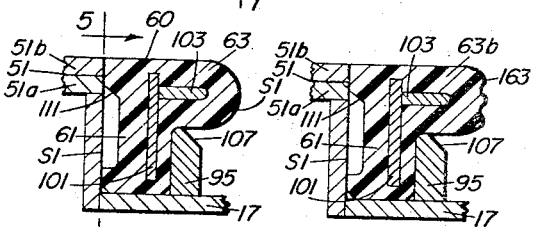
JOHN L. WILLIAMS
RUSSELL W. BUNCH
INVENTORS.
BY BUCKHORN, BLORE, KLARQUIST & SPARKMAN
ATTORNEYS

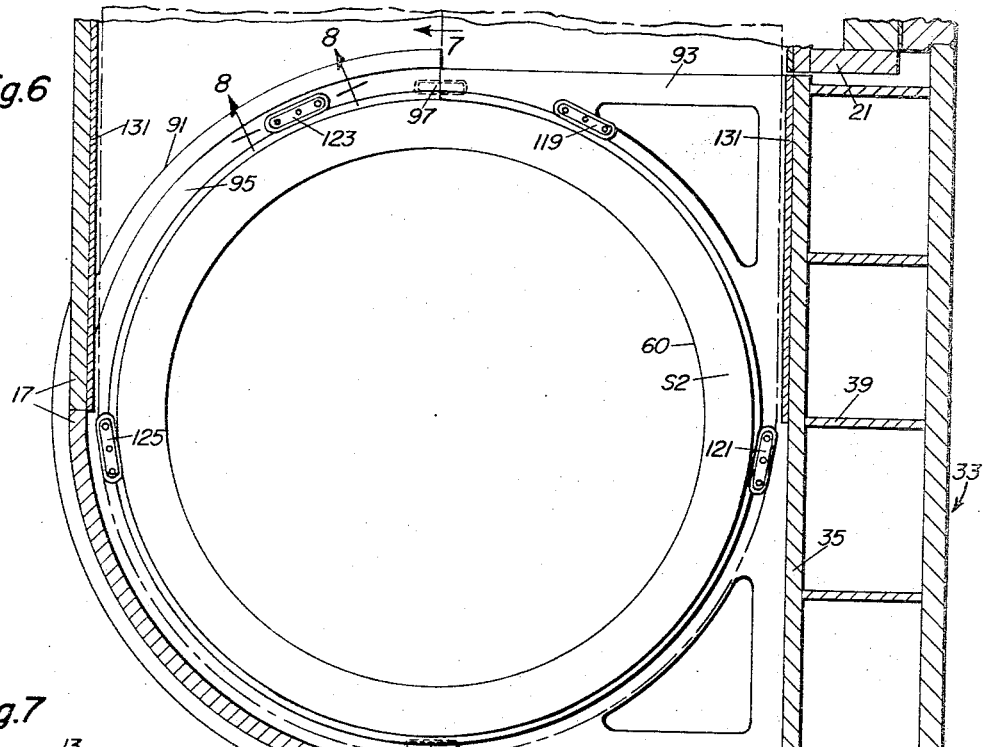
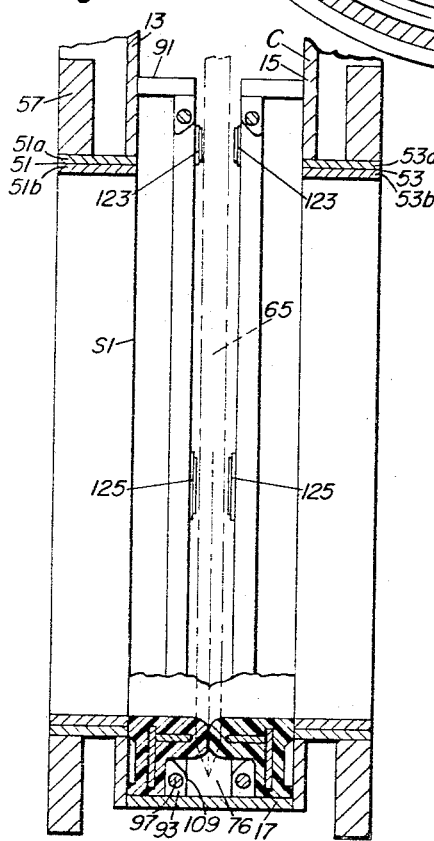
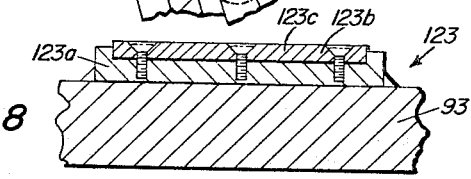

United States Patent Office 3,333,816
Patented Aug. 1, 1967

---

3,333,816
ELASTOMER SEAT GATE VALVE
John L. Williams, Lake Oswego, and Russell W. Bunch, Portland, Oreg.; said Bunch assignor to Fabri-Valve Company of America, Portland, Oreg., a corporation of Oregon
Filed Mar. 16, 1964, Ser. No. 352,115
9 Claims. (Cl. 251—327)

This invention relates to improvements in gate valves of the type having an elastomer seat member and a gate blade, wherein the blade is pressed against the seat member in the closed position of the valve to close off flow through the valve.

Prior valves of this type, and one is shown in the patent to Williams, No. 3,000,608, are effective at low pressures, say around 25–75 pound per square inch, but are not effective at higher pressures, say 150–250 pounds per square inch. One reason for this is that at high pressures, the blade is pressed against the elastomer seat member with such a force that the seat member portions which are engaged by the blade are so distorted that they are ineffective to form a seal with the blade. In fact, in some instances, the seat members may be permanently damaged.

A main object of the present invention is to provide a gate valve of the type under consideration which is so constructed that high pressures may be handled without encountering the distortion and damage heretofore experienced.

A further object is to provide a valve as above described in which the gate blade has its leading edge so formed that it can enter between a pair of elastomer seat members without damaging them.

Another important object is to provide a gate valve in which the elastomer seat member has a bead for engaging the blade, wherein the bead has an undulating face to provide for better contact with the blade.

A still further object is to provide a valve having a polyurethane seat member.

Various other objects of the invention will be apparent from the following description taken in connection with the accompanying drawings wherein:

FIG. 1 is a vertical essentially midsectional view through a valve embodying the concepts of the present invention, the view being taken along line 1—1 of FIG. 2;

FIG. 2 is a vertical sectional view taken through the valve along line 2—2 of FIG. 1, with parts broken away for convenience in illustration;

FIG. 3 is an edge view of the lower portion of the gate blade of the valve;

FIG. 4 is an enlarged fragmentary sectional view taaken along line 4—4 of FIG. 2;

FIG. 4A is a view similar to FIG. 4, but showing a modified form of the invention;

FIG. 5 is a fragmentary vertical sectional view taken along line 5—5 of FIG. 4;

FIG. 6 is an enlarged fragmentary sectional view taken along line 6—6 of FIG. 1;

FIG. 6A is an enlarged fragmentary view showing the relationship of one guide to the blade in the closed position of the blade;

FIG. 7 is a vertical sectional view taken along line 7—7 of FIG. 6; and

FIG. 8 is an enlarged fragmentary sectional view taken along line 8—8 of FIG. 6.

Referring to FIGS. 1 and 2, the valve includes a body which comprises a chest C and a bonnet B, the bonnet being detachably secured to the chest by bolts 11.

The chest is made up of a pair of spaced, parallel main chest plates 13 and 15 which are rectangular except that one lower corner portion of each is curved or rounded as shown in the case of plate 15 in FIG. 2. The plates 13 and 15 are joined together by a long strip 17 which is of generally right angular form with a curved central section. The plates are also joined together, at the upper portions thereof as the parts are shown in FIG. 2, by a short strip 19 (FIG. 2).

The right-hand portion of the strip 17, together with an inverted U-shaped piece 21, define a rectangular access opening for the removal and insertion of a pair of seat members $S_1$ and $S_2$, which are supported within the chest in a manner to be presently described. An open rectangular bolting flange 31 is secured to and around piece 21 and the strip 17.

The access opening is closed by a closure member 33 which is shown as including spaced inner and outer plates 35 and 37, respectively, joined by reinforcing spacer plates 39. An open rectangular bolting flange 41 surrounds and is secured to the outer plate 37. The flange 41 is attached to the flange 31 by bolts 43. Suitable seals or gaskets are disposed between the flanges 31 and 41.

The plates 13 and 15 of the chest C are formed with large circular aligned and coaxial holes in which are secured tubular flow passage members 51 and 53, respectively (FIG. 1). If the valve is to be lined, the tubular members 51 and 53 will comprise an outer member, 51a in the case of member 51, and 53a in the case of member 53, and a liner 51b in the case of member 51 and 53b in the case of member 53.

The tubular flow passage members are coaxial and in alignment with one another and each has a bolting flange 57 secured thereto, by which the valve body may be connected in a pipe line.

The seat members $S_1$ and $S_2$ are of identical construction and thus the construction of only one need be described. Each seat member is of annular form and has a circular port 60 therethrough. Each seat member has a flat, annular body portion 61 (FIG. 4) from one side of which integrally projects a circular elastomer bead 63. The bead is concentric with the port 60 and the inner diameter of the bead is the same as that of the port 60.

As is evident from FIG. 1, the seat members are arranged with the bead portions thereof in opposed relationship to cooperate with a gate blade 65 in closing off flow through the valve, in the closed position of the blade.

The blade 65 has a semicircularly curved lower end and a generally squarish upper end. A valve stem 71 is connected centrally to the upper end of the blade 65. It is conceivable that in a small valve the stem could be manually operated. However, since the valve is designed to control fluids at high pressures, if the valve is of any substantial size (say above 20 inch flow passage diameter) the blade must be power operated.

In the valve shown, the power means comprises a double-acting piston and cylinder unit 73 mounted on a bracket structure 75 (FIGS. 1 and 2). The bracket structure is in turn mounted on the bonnet B.

The stem 71 constitutes the piston rod of the piston and cylinder unit 73 and extends upwardly through a packing box 77 into the cylinder of the unit 73. The box 77 is secured to the bonnet B.

A gauge rod 81 is connected to the upper end of the blade 65 and extends upwardly through a small packing box 83, which is carried by the bonnet B. The gauge rod 81 has markings thereon whereby the degree of opening of the blade 65 can be determined.

Now returning to the seat members $S_1$ and $S_2$, these members fit within the chest C with peripheral edges of the body portions 61 thereof disposed in nesting relationship against the strip 17 and against a pair of spaced, curved backing strips 91 (FIGS. 1 and 2). The seat members are held in such nesting relationship by a pair of spaced retainers 93. The retainers have straight rear portions secured to the closure member 33, and have semicircularly curved front portions fitting in nesting relationship against the base portions of the beads 63 of the seat members (FIGS. 1 and 2).

There are also spaced, semicircularly curved, bead engaging strips 95 (FIGS. 2, 6 and 7) secured to the backing strips 91 and the chest strip 17. The bead engaging strips 95 and the retainers 93 provide 360° contact with the beads 63.

The inner ends of the retainers 93 carry dowel pins 97 (FIGS. 1 and 2) which fit within complementary bores provided in the end portions of the strips 95.

The thickness of each seat member taken through the bead portion thereof is greater than one-half the width of the chest chamber, i.e., one-half the distance between the inner faces of the main chest plates 13 and 15. This means that in the open position of the valve (with the blade raised) the beads of the seat members are disposed in compressed seating engagement with one another. This arrangement in combination with a feature to be described hereinafter insures adequate compression of the beads against the blade 65 in the closed position of the blade so that high pressure fluids can be handled by the valve.

FIG. 4 best shows the specific construction of a seat member. There it is apparent that a rigid reinforcing member is embedded within the body 61 and bead 63 of the seat member. The reinforcing member is of annular form and comprises a flat annular member 101 and a ring member 103 permanently secured together in coaxial relationship. The ring member 103 has a diameter slightly greater than the internal diameter of the annular member 101 and is secured to one side face of the annular member 101.

The ring member portion of the reinforcing member has several functions. First, it positively prevents deflection of the bed 63 as a whole because it projects a substantial extent into the bead. Thus it prevents excessive inward bulging of the bead even under much higher pressures than valves of the general type under discussion normally handle. Also, the ring member 103 prevents excessive flattening of the bead under pressure from the blade 65, which flattening limits the contact pressure between the bead and blade to a valve which would preclude the valve handling the desired high pressures which it can handle.

Cooperating with the ring member 103 in insuring proper firm contact with the blade 65 are the strips 95 and the retainers 93. While such strips and retainers are in firm engagement with the base portions of the beads 63, they are relieved on the inner corners next to the blade 65 at 107 for strips 95 (FIG. 4) and 109 for retainers 93 (FIG. 1). This relief enables the beads to be symmetrically flattened without danger of crushing the outer bead portions against the strips and retainers 93 at the relieved places.

One drawback to reinforcement of the bead is that it is difficult to reinforce the bead against excessive lateral deflection without getting excessive contact pressures between the blade and head because of the relatively thin layer of elastomer material between the ring member and blade. That is to say, if the ring member projects only slightly into the bead to obtain the desired contact pressure with the blade, excessive lateral distortion of the bead will occur because the bead lacks lateral stability. On the other hand, if the ring member is made to project a substantial extent into the bead as shown (roughly to the center of curvature of the rounded portion of the bead), excessive lateral deflection of the bead is prevented, but excessive contact pressure will result, at least with what are termed firm durometer elastomers.

We have cured this problem by making the portions of the seat member which are next to the main chest walls more resilient by providing a plurality of circumferentially spaced recesses or pockets 111 in such portions. We prevent excess inward bulging of the inner corners of such portions by providing ribs 113 (FIG. 5) between the recesses. Thus, the beads cannot deflect excessively because of the ring members 103, and yet excessive contact pressures between the blade and beads is prevented by the recesses 111.

However, even with the recesses, excessive contact pressure and/or excessive side deflection of the blade 65 could occur were it not for a further feature of the invention.

Provided on each retainer 93 is an upper guide stop 119 and a lower guide stop 121 (FIGS. 2 and 6) and provided on each bead engaging strip is an upper guide stop 123 and a lower guide stop 125 (FIGS. 2, 6 and 7). All of the guide stops 121–125 are of identical construction (which is to be detailed hereinafter) but are given different reference numerals for convenience in description.

The upper guide stops 119 and 123 are located in symmetrical spaced relation on the opposite sides of the center line of the valve (FIG. 6) and are also spaced from the closure 33 and the strip 117, respectively, as shown in FIG. 6. Thus, the guide stops 119 and 123 are located substantially above the level of the axis of the flow passage of the valve.

The lower guide stops 121 and 125 are also symmetrically spaced on opposite sides of the center line of the valve but are located close to the closure 33 and strip 117, respectively, and thus are located closer to the level of flow passage axis than are the guide stops 119 and 123. In fact, the stops 121 and 125 are located sufficiently high that they can engage the lower semicircular margin of the blade 65 inwardly of a double bevel 126 (FIG. 3) provided on the blade.

The detail construction of a guide stop, one of stops 123, is shown in FIG. 8. The stop comprises a pad or base portion 123a formed with an elongate recess 123b. Fitting into this recess is an anti-friction, elongate guide piece 123c which is secured to the base portion by countersunk screws 123d. The piece may for instance, be formed of bronze to engage against a steel blade 65.

FIG. 7 shows that the blade-engaging faces of opposed guide stops are spaced from one another by a distance greater than the thickness of the blade so as to be spaced from the blade in the undeflected (or unshifted) condition of the blade. The planes of such faces are however spaced from and do not intersect the associated ring members 103 of the associated seat members. In fact, each such plane passes through the bead 63 of the associated seat member intermediate the axial thickness of the bead as measured from the free edge of the ring member 103 to the apical surface portions of such bead 63. Thus the guide stops limit the deflection of the beads 63 so as to prevent crushing thereof and limit sidewise deflection of the blade 65. Furthermore, the guide stops allow the blade when closed and under heavy pressure to be raised without tearing or rupturing the downstream bead. It will be appreciated that tearing or rupturing of the downstream bead could occur if the bead were grossly distorted by the blade (because of high upstream pressures) and the blade were raised under such circumstances. Such a situation would not be unlike that created by placing a blade against a bead and applying heavy pressure to the blade to squash the bead down against the ring member 103 and then moving the blade back and forth across the bead while maintaining such heavy pressure.

It is further pointed out that recesses 111 allow a bodily shifting of the reinforcing member of a seat member when the seat member is under heavy blade pressure, to relieve excessive pressures on the bead portions thereof while maintaining firm operating pressures between the bead and blade.

It is evident from the above that the guide stops are of considerable assistance in enabling the blade 65 to be moved from an opened to a closed position without damaging the downstream bead. In our valve, the terms "upstream" and "downstream" can mean either side of the valve depending on the location of the high pressure fluid.

FIGS. 2 and 6 show that the interior of the chest and bonnet B, opposite the side edges of the blade 65, have lining strips 131 and 133, respectively, to properly guide the blade during its upward and downward travel.

Most of the special features heretofore described have been for the purpose of attaining high contact pressure between the blade and beads 63 of the seat members, in order that high pressures may be handled, without damage to the beads. Another feature aiding in this direction is the bevel 126 on blade 65. The bevel is sharper than heretofore provided, and in fact, the included angle between the opposed bevel faces is less than 45° and preferably less than 40°. With this thin edge, the blade can enter between the compressed beads 63 of the seat members without unduly distorting them. In addition, the blade itself is tapered slightly from top to bottom to enable the blade to more readily force its way between the seats $S_1$ and $S_2$.

The bevel extends around the blade and gradually increases in angle until before the 180° points are reached the angle is almost gone, i.e., it is almost 180°.

The FIG. 4A seat member is like the FIG. 4 seat member except that the bead 63b has an undulated face providing a plurality of smaller beads 163 having the blade contacting portions thereof located for concurrent engagement with the blade. We have found that a better seal is attained by the FIG. 4A construction, and that the FIG. 4A bead is capable of seating at even higher pressures than that for which the FIG. 4 bead is designed.

Returning to FIG. 2, the seat members $S_1$ and $S_2$ may be removed from the chest C, without removing the valve from the line, by removing the closure 33. The closure of course carries the retainers 93 with it thus enabling first one and then the other seat member to be removed through the side access opening of the chest.

We have found that polyurethane for use as a valve seat is stronger than neoprene, and has better elastic memory and has better resistance to abrasion. We have found that we can form the elastomer portions of the seat member $S_1$ and $S_2$ of polyurethane, and that with the forms shown, the polyurethane can resist the compression pressures imposed thereon, by high pressure fluids, without damage to the seat members. In fact, one valve of 6" flow passage diameter successfully held 200 pound per square inch water without leakage. We have concluded that the life of the polyurethane seats will probably be 100 times that of neoprene seats. While polyurethane is more expensive, the overall cost over the lifetime of the valve will be greatly less.

Having described the invention in what is considered to be the preferred embodiment thereof, it is desired that it be understood that the invention is not to be limited other than by the provisions of the following claims.

What is claimed is:
1. A gate valve comprising:
a body which includes a chest portion,
said chest portion including spaced parallel chest walls formed with aligned holes,
said body having spaced, aligned, tubular members connected to said chest in alignment with said holes,
each member having an inner surface defining a flow passage,
the portions of such flow passages which are located next to said chest being circular and of the same diameter,
a pair of separate seat members each disposed in said chest and each having a circular port therein of the same size as said flow passages,
means releasably supporting said seat members in said chest with said ports aligned with one another and with said flow passages so that the surfaces of said seat members which define said ports form continuations of the inner surfaces of said tubular members,
each seat member having a flat elastomer body portion from one side of which integrally projects a circular elastomer bead,
the bead of a seat member being in concentric relation to the port of such member and the inner diameter of said bead being the same as that of such port,
said seat members being arranged with the bead portions thereof in opposed relationship,
a gate blade mounted for movement from an open position to a closed position where it is disposed between said beads in compressed relation with each,
each seat member having a rigid annular reinforcing structure embedded therein,
said structure including an annular member located in the body portion of its seat member and a ring member joined to said annular member and projecting into the bead of its seat member whereby to limit inward deflection of said bead under pressure imposed thereon by high pressure fluid acting through said blade against said bead,
guide means fixedly mounted in said chest next to, but in spaced relation from, the opposite faces of said blade so as to limit lateral movement of said blade and thus limit compression of said beads,
said fixed guide means having anti-friction surfaces for engaging said blade to enable said blade to be withdrawn from between said beads even though high pressure fluid is forcing said blade firmly against said guide means,
the face of the body portion of each seat member which is remote from the associated bead having a series of recesses formed therein to facilitate compression of the outer portions of said body portion to thereby avoid excessive compression of the associated bead,
said recesses being separated by a series of generally radially extending rib portions which limit inwardly bulging of the associated inner corner portion of said seat member,
said mounting means including a rigid annular retaining element for each seat member disposed in contact with the face thereof which is next to said blade and extending radially inwardly into contact with the associated bead at a place next to the just mentioned face,
the inner corner of each annular retaining element that is nearest the gate blade being relieved to provide space for radially outward bulging of the associated bead to thereby avoid excessive bulging of said bead in a radially inward direction,
the leading edge portion of said blade being symmetrically beveled on the opposite sides thereof, to provide a beveled knife edge,
the angle between the faces that define said beveled knife edge being less than 45° so that such leading edge can enter between the beads of the slot members without damaging them,
the crown portion of each bead, in cross section, being undulating so as to provide a plurality of ridges for contact with the gate blade.
2. A gate valve comprising:
a body which includes a chest portion,
said chest portion including spaced parallel chest walls formed with aligned holes,
said body having spaced, aligned, tubular members connected to said chest in alignment with said holes,
each member having an inner surface defining a flow passage,
the portions of such flow passages which are located next to said chest being circular and of the same diameter,
a pair of separate seat members each disposed in said chest and each having a circular port therein of the same size as said flow passages,
means releasably supporting said seat members in said chest with said ports aligned with one another and with said flow passages so that the surfaces of said seat members which define said ports form continuations of the inner surfaces of said tubular members, each seat member having a flat elastomer body portion from one side of which integrally projects a circular elastomer bead, the bead of a seat member being in concentric relation to the port of such member and the inner diameter of said bead being the same as that of such port, said seat members being arranged with the bead portions thereof in opposed relationship, a gate blade mounted for movement from an open position to a closed position where it is disposed between said beads in compressed relation with each, each seat member having a rigid annular reinforcing structure embedded therein, said structure including an annular member located in the body portion of its seat member and a ring member joined to said annular member and projecting into the bead of its seat member whereby to limit inward deflection of said bead under pressure imposed thereon by high pressure fluid acting through said blade against said bead, guide means fixedly mounted on said chest next to, but in spaced relation from, the opposite faces of said blade so as to limit lateral movement of said blade and thus limit compression of said beads, said fixed guide means having anti-friction surfaces for engaging said blade to enable said blade to be withdrawn from between said beads even though high pressure fluid is forcing said blade firmly against said guide means, the face of the body portion of each seat member which is remote from the associated bead having a series of recesses formed therein to facilitate compression of the outer portions of said body portion to thereby avoid excessive compression of the associated bead, said recesses being separated by a series of generally radially extending rib portions which limit inwardly bulging of the associated inner corner portion of said seat member, said mounting means including a rigid annular retaining element for each seat member disposed in contact with the face thereof which is next to said blade and extending radially inwardly into contact with the associated bead at a place next to the just mentioned face, the inner corner of each annular retaining element that is nearest the gate blade being relieved to provide space for radially outward bulging of the associated bead to thereby avoid excessive bulging of said head in a radially inward direction, the leading edge portion of said blade being symmetrically beveled on the opposite sides thereof, to provide a beveled knife edge, the angle between the faces that define said beveled knife edge being less than 45° so that such leading edge can enter between the beads of the slot members without damaging them.

3. A gate valve comprising:

a body which includes a chest portion, said chest portion including spaced parallel chest walls formed with aligned holes, said body having spaced, aligned, tubular members connected to said chest in alignment with said holes, each member having an inner surface defining a flow passage, the portions of such flow passages which are located next to said chest being circular and of the same diameter, a pair of separate seat members each disposed in said chest and each having a circular port therein of the same size as said flow passages, means releasably supporting said seat members in said chest with said ports aligned with one another and with said flow passages so that the surfaces of said seat members which define said ports form continuations of the inner surfaces of said tubular members, each seat member having a flat elastomer body portion from one side of which integrally projects a circular elastomer bead, the bead of a seat member being in concentric relation to the port of such member and the inner diameter of said bead being the same as that of such port, said seat members being arranged with the bead portions thereof in opposed relationship, a gate blade mounted for movement from an open position to a closed position where it is disposed between said beads in compressed relation with each, each seat member having a rigid annular reinforcing structure embedded therein, said structure including an annular member located in the body portion of its seat member and a ring member joined to said annular member and projecting into the bead of its seat member whereby to limit inward deflection of said bead under pressure imposed thereon by high pressure fluid acting through said blade against said bead, guide means fixedly mounted in said chest next to, but in spaced relation from, the opposite faces of said blade so as to limit lateral movement of said blade and thus limit compression of said beads, said fixed guide means having anti-friction surfaces for engaging said blade to enable said blade to be withdrawn from between said beads even though high pressure fluid is forcing said blade firmly against said guide means, the face of the body portion of each seat member which is remote from the associated bead having a series of recesses formed therein to facilitate compression of the outer portions of said body portion to thereby avoid excessive compression of the associated bead, said recesses being separated by a series of generally radially extending rib portions which limit inwardly bulging of the associated inner corner portion of said seat member, said mounting means including a rigid annular retaining element for each seat member disposed in contact with the face thereof which is next to said blade and extending radially inwardly into contact with the associated bead at a place next to the just mentioned face, the inner corner of each annular retaining element that is nearest the gate blade being relieved to provide space for radially outward bulging of the associated bead to thereby avoid excessive bulging of said bead in a radially inward direction.

4. A gate valve comprising:

a body which includes a chest portion, said chest portion including spaced parallel chest walls formed with aligned holes, said body having spaced, aligned, tubular members connected to said chest in alignment with said holes, each member having an inner surface defining a flow passage, the portions of such flow passages which are located next to said chest being circular and of the same diameter, a pair of separate seat members each disposed in said chest and each having a circular port therein of the same size as said flow passages, means releasably supporting said seat members in said chest with said ports aligned with one another and with said flow passages so that the surfaces of said seat members which define said ports form continuations of the inner surfaces of said tubular members, each seat member having a flat elastomer body portion from one side of which integrally projects a circular elastomer bead, the bead of a seat member being in concentric relation to the port of such member and the inner diameter of said bead being the same as that of such port, said seat members being arranged with the bead portions thereof in opposed relationship, a gate blade mounted for movement from an open position to a closed position where it is disposed between said beads in compressed relation with each, each seat member having a rigid annular reinforcing structure embedded therein, said structure including an annular member located in the body portion of its seat member and a ring member joined to said annular member and projecting into the bead of its seat member whereby to limit inward deflection of said bead under pressure imposed thereon by high pressure fluid acting through said blade against said bead, guide means fixedly mounted in said chest next to, but in spaced relation from, the opposite faces of said blade so as to limit lateral movement of said blade and thus limit compression of said beads, and said fixed guide means having anti-friction surfaces for engaging said blade to enable said blade to be withdrawn from between said beads even though high pressure fluid is forcing said blade firmly against said guide means.

5. A gate valve comprising:

a body which includes a chest portion, said chest portion including spaced parallel chest walls formed with aligned holes, said body having spaced, aligned, tubular members connected to said chest in alignment with said holes, each member having an inner surface defining a flow passage, the portions of such flow passages which are located next to said chest being circular and of the same diameter, a pair of separate seat members each disposed in said chest and each having a circular port therein of the same size as said flow passages, means releasably supporting said seat members in said chest with said ports aligned with one another and with said flow passages so that the surfaces of said seat members which define said ports form continuations of the inner surfaces of said tubular members, each seat member having a flat elastomer body portion from one side of which integrally projects a circular elastomer bead, the bead of a seat member being in concentric relation to the port of such member and the inner diameter of said bead being the same as that of such port, said seat members being arranged with the bead portions thereof in opposed relationship, a gate blade mounted for movement from an open position to a closed position where it is disposed between said beads in compressed relation with each, each seat member having a rigid annular reinforcing structure embedded therein, said structure including an annular member located in the body portion of its seat member and a ring member joined to said annular member and projecting into the bead of its seat member whereby to limit inward deflection of said bead under pressure imposed thereon by high pressure fluid acting through said blade against said bead, and guide means fixedly mounted in said chest next to, but spaced relation from, the opposite faces of said blade so as to limit lateral movement of said blade and thus limit compression of said beads.

6. A gate valve comprising:

a body which includes a chest portion, said chest portion including spaced parallel chest walls formed with aligned holes, said body having spaced, aligned, tubular members connected to said chest in alignment with said holes, each member having an inner surface defining a flow passage, the portions of such flow passages which are located next to said chest being circular and of the same diameter, a pair of separate seat members each disposed in said chest and each having a circular port therein of the same size as said flow passages, means releasably supporting said seat members in said chest with said ports aligned with one another and with said flow passages so that the surfaces of said seat members which define said ports form continuations of the inner surfaces of said tubular members, each seat member having a flat elastomer body portion from one side of which integrally projects a circular elastomer bead, the bead of a seat member being in concentric relation to the port of such member and the inner diameter of said bead being the same as that of such port, said seat members being arranged with the bead portions thereof in opposed relationship, a gate blade mounted for movement from an open position to a closed position where it is disposed between said beads in compressed relation with each, each seat member having a rigid annular reinforcing structure embedded therein, and the face of the body portion of each seat member which is remote from the associated bead having a series of recesses formed therein to facilitate compression of the outer portions of said body portion to thereby avoid excessive compression of the associated bead.

7. A gate valve comprising:

a body which includes a chest portion, said chest portion including spaced parallel chest walls formed with aligned holes, said body having spaced, aligned, tubular members connected to said chest in alignment with said holes, each member having an inner surface defining a flow passage, the portions of such flow passages which are located next to said chest being circular and of the same diameter, a pair of separate seat members each disposed in said chest and each having a circular port therein of the same size as said flow passages, means releasably supporting said seat members in said chest with said ports aligned with one another and with said flow passages so that the surfaces of said seat members which define said ports form continuations of the inner surfaces of said tubular members, each seat member having a flat elastomer body portion from one side of which integrally projects a circular elastomer bead, the bead of a seat member being in concentric relation to the port of such member and the inner diameter of said bead being the same as that of such port, said seat members being arranged with the bead portions thereof in opposed relationship, a gate blade mounted for movement from an open position to a closed position where it is disposed between said beads in compressed relation with each, each seat member having a rigid annular reinforcing structure embedded therein, said structure including an annular member located in the body portion of its seat member and ring member joined to said annular member and projecting into the bead of its seat member whereby to limit inward deflection of said bead under pressure imposed thereon by high pressure fluid acting through said blade against said bead, guide means fixedly mounted in said chest next to, but in spaced relation from, the opposite faces of said blade so as to limit lateral movement of said blade and thus limit compression of said beads, said fixed guide means having anti-friction surfaces for engaging said blade to enable said blade to be withdrawn from between said beads even though high pressure fluid is forcing said blade firmly against said guide means, and said guide means being located in planes which intersect said beads intermediate the axial dimensions of said beads.

8. A gate valve comprising:

a body which includes a chest portion, said chest portion including spaced parallel chest walls formed with aligned holes, said body having spaced, aligned, tubular members connected to said chest in alignment with said holes, each member having an inner surface defining a flow passage, the portions of such flow passages which are located next to said chest being circular and of the same diameter, a pair of separate seat members each disposed in said chest and each having a circular port therein of the same size as said flow passages, means releasably supporting said seat members in said chest with said ports aligned with one another and with said flow passages so that the surfaces of said seat members which define said ports form continuations of the inner surfaces of said tubular members, each seat member having a flat elastomer body portion from one side of which integrally projects a circular elastomer bead, the bead of a seat member being in concentric relation to the port of such member and the inner diameter of said bead being the same as that of such port, said seat members being arranged with the bead portions thereof in opposed relationship, a gate blade disposed between and movable relative to said beads in compressed relationship with respect thereto, each seat member having a rigid annular reinforcing structure embedded therein, said structure including an annular member located in the body portion of its seat member and a ring member joined to said annular member and projecting into the bead of its seat member whereby to limit inward deflection of said bead under pressure imposed thereon by high pressure fluid acting through said blade against said bead, guide means fixedly mounted in said chest next to, but in spaced relation from, the opposite faces of said blade so as to limit lateral movement of said blade and thus limit compression of said beads, said fixed guide means having anti-friction surfaces for engaging said blade to enable said blade to be moved relative to said beads even though high pressure fluid is forcing said blade firmly against said guide means, the face of the body portion of each seat member which is remote from the associated bead having a series of recesses formed therein to facilitate compression of the outer portions of said body portion to thereby avoid excessive compression of the associated bead, said recesses being separated by a series of generally radially extending rib portions which limit inwardly bulging of the associated inner corner portion of said seat member, said mounting means including a rigid annular retaining element for each seat member disposed in contact with the face thereof which is next to said blade and extending radially inwardly into contact with the associated bead at a place next to the just mentioned face, the inner corner of each annular retaining element that is nearest the gate blade being relieved to provide space for radially outward bulging of the associated bead to thereby avoid excessive bulging of said bead in a radially inward direction, the crown portion of each bead, in cross section, being undulating so as to provide a plurality of ridges for contact with the gate blade.

9. A gate valve comprising a body providing spaced aligned flow passageway portions and providing a chamber between said flow passageway portions for occupancy by a pair of seat members, a pair of separate seat members each disposed in said chamber and each having a port therein of the same shape and size as said flow passageway portions, means releasably supporting said seat members in said chamber with the ports thereof aligned with one another and with the flow passageway portions so that the surfaces of said seat members which define said ports form continuations of said flow passageway portions, each seat member having a flat elastomer body portion from one side of which integrally projects of a circular elastomer bead, the bead of a seat member being in concentric relation to the port and the inner diameter of said bead being the same as that of such port, said members being arranged with the bead portions thereof in opposed relationship, a gate blade disposed between said beads and movable with respect thereto in compressed relationship with respect therewith, each seat member having a rigid annular reinforcing structure embedded therein, said structure including an annular member located in the body portion of its seat member and a ring member joined to said annular member and projecting into the bead of its seat member whereby to limit inward deflection of said bead under pressure imposed thereon by high pressure fluid acting through said blade against said bead, guide means fixedly mounted in said body next to, but in spaced relation from, the opposite faces of said blade so as to limit lateral movement of said blade and thus limit compression of said beads, said fixed guide means having anti-friction surfaces for engaging said blade to enable said blade to be moved relative to said beads even though high pressure fluid is forcing said blade firmly against said guide means, the face of the body portion of each seat member which is remote from the associated bead having a series of recesses formed therein to facilitate compression of the outer portions of said body portion to thereby avoid excessive compression of the associated bead, said recesses being separated by a series of generally radially extending rib portions which limit inwardly bulging of the associated inner corner portion of said seat member, said mounting means including a rigid annular retaining element for each seat member disposed in contact with the face thereof which is next to said blade and extending radially inwardly into contact with the associated bead at a place next to the just mentioned face, the inner corner of each annular retaining element that is nearest the gate blade being relieved to provide space for radially outward bulging of the associated bead to thereby avoid excessive bulging of said bead in a radially inward direction, the crown portion of each bead, in cross section, being undulating so as to provide a plurality of ridges for contact with the gate blade.

References Cited

UNITED STATES PATENTS

| | | | |
|---|---|---|---|
| 2,701,117 | 2/1955 | Basherk | 251—326 X |
| 2,856,149 | 10/1958 | Dick | 251—326 X |
| 3,000,608 | 9/1961 | Williams | 251—329 X |
| 3,052,259 | 9/1962 | Velden | 251—368 X |
| 3,085,784 | 4/1963 | Dumm | 251—358 X |
| 3,207,471 | 9/1965 | Williams | 251—328 |

M. CARY NELSON, *Primary Examiner.*

ARNOLD ROSENTHAL, *Assistant Examiner.*

UNITED STATES PATENT OFFICE
CERTIFICATE OF CORRECTION

Patent No. 3,333,816                      August 1, 1967

John L. Williams et al.

It is hereby certified that error appears in the above numbered patent requiring correction and that the said Letters Patent should read as corrected below.

In the heading to the printed specification, lines 4 and 5, for "; said Bunch assignor to Fabri-Valve Company of America," read -- , assignors to Fabri-Valve Company of America, --; column 1, line 51, for "taaken" read -- taken --; column 3, line 59, for "head" read -- bead --; column 7, line 25, for "on" read -- in --; column 12, line 28, strike out "of".

Signed and sealed this 25th day of June 1968.

(SEAL)
Attest:

Edward M. Fletcher, Jr.                  EDWARD J. BRENNER
Attesting Officer                          Commissioner of Patents